United States Patent [19]
Miyamoto et al.

[11] Patent Number: 5,537,912
[45] Date of Patent: Jul. 23, 1996

[54] BEARING ADJUSTING MECHANISM FOR RODLESS CYLINDER

[75] Inventors: Michikazu Miyamoto; Tadashi Saito; Naoki Hoshi, all of Ibaraki-ken, Japan

[73] Assignee: SMC Kabushiki Kaisha, Tokyo, Japan

[21] Appl. No.: 421,969

[22] Filed: Apr. 14, 1995

[30] Foreign Application Priority Data

Apr. 27, 1994 [JP] Japan ................................. 6-089449

[51] Int. Cl.$^6$ ............................................. F01B 29/00
[52] U.S. Cl. ........................... 92/88; 92/165 R; 384/57
[58] Field of Search ............................. 92/88, 165 R; 384/57, 58

[56] References Cited

U.S. PATENT DOCUMENTS

| | | | |
|---|---|---|---|
| 4,715,730 | 12/1987 | Magnuson | 384/58 |
| 4,884,898 | 12/1989 | Magnuson | 384/58 |
| 4,944,608 | 7/1990 | Osawa | 384/58 |
| 5,097,716 | 3/1992 | Barbat et al. | 92/88 |

FOREIGN PATENT DOCUMENTS 577995  1/1994  Japan ................................ 384/58

*Primary Examiner*—Thomas E. Denion
*Attorney, Agent, or Firm*—Oblon, Spivak, McClelland, Maier, & Neustadt

[57] ABSTRACT

A rodless cylinder has adjusting mechanisms, each comprising a gear shaft rotatably mounted in a hole defined in an outer wall of a slide table and having a first gear on an end thereof, an adjustment shaft having a second gear on an end thereof which is held in mesh with the first gear at a predetermined angle, and a rod coupled to an opposite end of the adjustment shaft out of alignment with a central axis of adjustment shaft, with a guide roller being rotatably supported on the rod. When the gear shaft is turned by a screwdriver bit inserted in the hole, the adjustment shaft is turned to displace the guide rod for optimum rolling contact with a rail on a cylinder tube. The rolling contact between the guide rod and the rail can be adjusted from the outer side of the slide table.

7 Claims, 10 Drawing Sheets

BEARING ADJUSTING MECHANISM FOR RODLESS CYLINDER

BACKGROUND OF THE INVENTION

1. Field of the Invention

The present invention relates to a bearing adjusting mechanism for use between the cylinder tube and slide table of a rodless cylinder, and more particularly to a bearing adjusting mechanism capable of easily adjusting a bearing in a rodless cylinder.

2. Description of the Related Art

Recently, rodless cylinders have being finding wide use as workpiece feed apparatus in factories or the like. The rodless cylinder takes up a small space and can easily be handled because the length of its displaceable stroke is shorter than conventional cylinders with piston rods and also because it has a highly accurate positioning capability as dust particles are prevented from entering the cylinder unlike conventional cylinders with piston rods.

FIG. 10 of the accompanying drawings shows a rodless cylinder 1 of this type.

As shown in FIG. 10, this rodless cylinder 1 includes a cylinder tube 2, a slide table 3, and a piston (not shown). When supplied with air under pressure through a port (not shown), the piston is displaced to move the slide table 3 linearly back and forth in unison with the piston with respect to the cylinder tube 2. A bearing mechanism is interposed between the slide table 3 and the cylinder tube 2 for allowing the slide table 3 to be displaced smoothly with respect to the cylinder tube 2.

The bearing mechanism shown in FIG. 10 comprises a rail 4 fixed to and extending longitudinally on a side wall of a recess in the cylinder tube 2, and an eccentric roller 5 held in rolling contact with the rail 4. The rolling contact between the rail 4 and the eccentric roller 5 can be adjusted by a bearing adjusting mechanism. The bearing adjusting mechanism comprises a screw 6 threaded in a through hole defined in the slide table 3 and inclined from its upper surface to its lower surface, a rod 7 supported on the screw 6 and holding the eccentric roller 5 thereon for rotation, and a lock nut 8 by which the screw 9 is secured to the slide table 3. The rod 7 is fixed to the screw 6 out of alignment with the central axis of the screw 6. A workpiece 9 to be fed by the rodless cylinder 1 is fixedly mounted on an upper surface of the slide table 3.

When the screw 6 is turned clockwise or counterclockwise by a screwdriver bit or the like, the rod 7 is also turned with the screw 6. Therefore, the eccentric roller 5 is also turned in one of the directions indicated by the arrows for thereby adjusting rolling contact between the rail 4 and the eccentric roller 5.

In the conventional bearing adjusting mechanism, the rolling contact between the rail 4 and the eccentric roller 5 can be adjusted only in the axial direction of the screw 6, i.e., from the upper surface of the slide table 3. After the rolling contact between the rail 4 and the eccentric roller 5 has been adjusted, the workpiece 9 is fastened to the upper surface of the slide table 3. If for some reason the bearing mechanism has to be adjusted again after the workpiece 9 is fastened to the upper surface of the slide table 3, then it is necessary to detach the workpiece 9 from the upper surface of the slide table 3. Such a detachment process and a subsequent process of attaching the workpiece 9 again are quite tedious and time-consuming.

Another problem is that since the direction in which the screw 6 can be accessed for adjustment is limited, the rodless cylinder 1 may have to be removed from another apparatus in which it is incorporated, before the rodless cylinder 1 is serviced for maintenance.

SUMMARY OF THE INVENTION

It is therefore an object of the present invention to provide a rodless cylinder having bearing mechanisms which can be adjusted from various directions.

To achieve the above object, there is provided in accordance with the present invention a bearing adjusting mechanism in a rodless cylinder having a cylinder tube having ports for introducing and discharging a fluid under pressure, the cylinder tube having a rail extending therealong, a piston disposed in the cylinder tube for displacement along the cylinder tube by the fluid introduced under pressure into the cylinder tube, a slide table coupled to the piston for supporting a workpiece thereon, the slide table having a guide roller held in rolling contact with the rail, the bearing adjusting mechanism comprising an adjusting mechanism mounted on the slide table for adjusting the rolling contact of the guide roller with the rail, the adjusting mechanism having means for allowing an eccentric axis of the guide roller to be turned from an outer wall of the slide table.

The adjusting mechanism preferably comprises a gear shaft rotatably mounted in a hole defined in the outer wall of the slide table and having a first gear on an end thereof, an adjustment shaft having a second gear on an end thereof which is held in mesh with the first gear at a predetermined angle, and a rod coupled to an opposite end of the adjustment shaft out of alignment with a central axis of the adjustment shaft, the guide roller being rotatably supported on the rod.

A screwdriver bit or the like is inserted into an adjustment hole defined in the outer wall and turned in engagement with the screw shaft, causing the adjustment shaft and the rod to turn to displace the guide roller for thereby adjusting the rolling contact of the guide roller with the rail.

Even after a workpiece is fixedly mounted on an upper surface of the slide table or the rodless cylinder is incorporated in another apparatus, the rolling engagement between the guide roller and the rail can easily be adjusted from the other side of the slide table. Therefore, the rodless cylinder can be serviced for maintenance in a short period of time.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
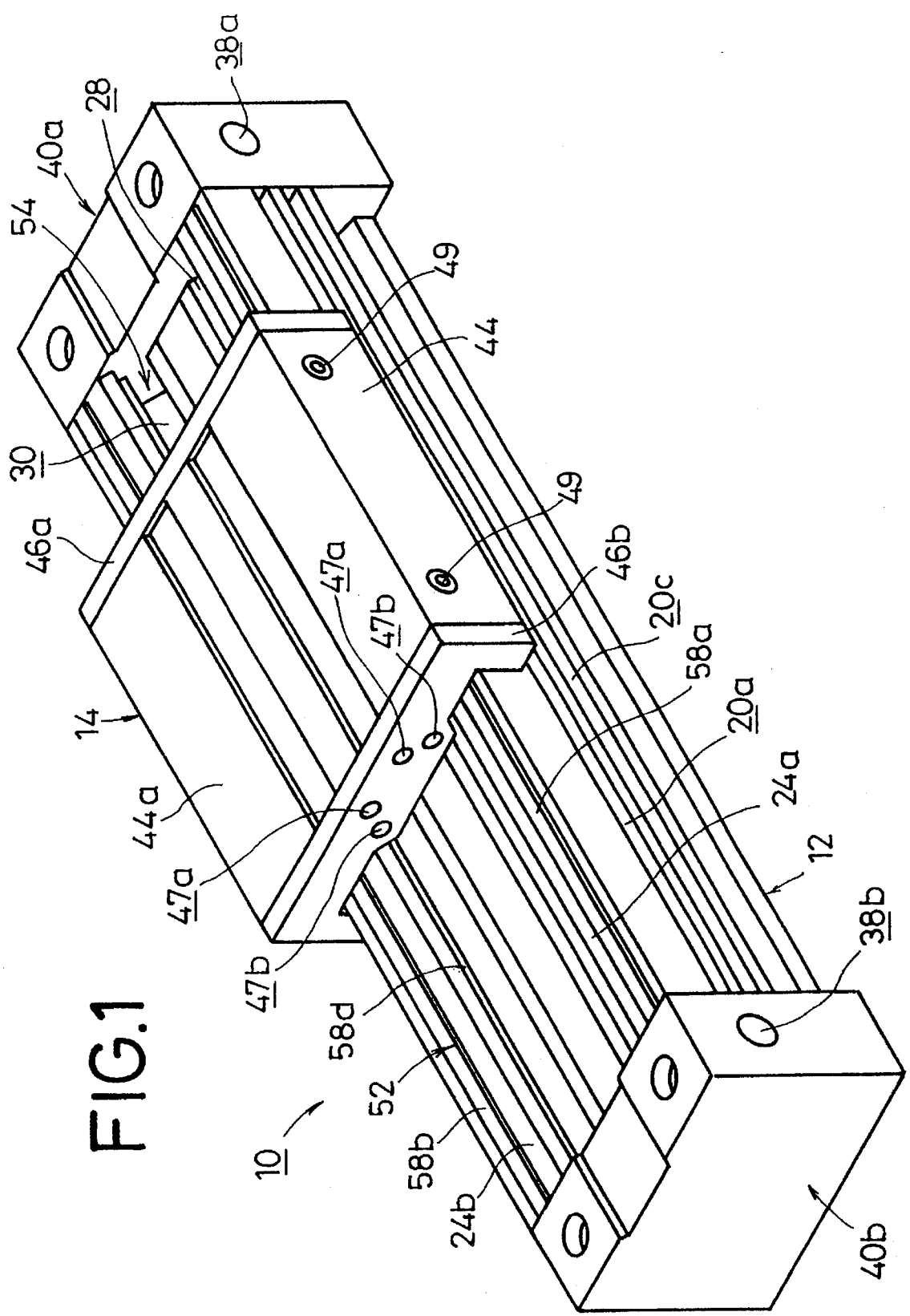
FIG. 1 is a perspective view of a rodless cylinder according to the present invention.
Figure 2:
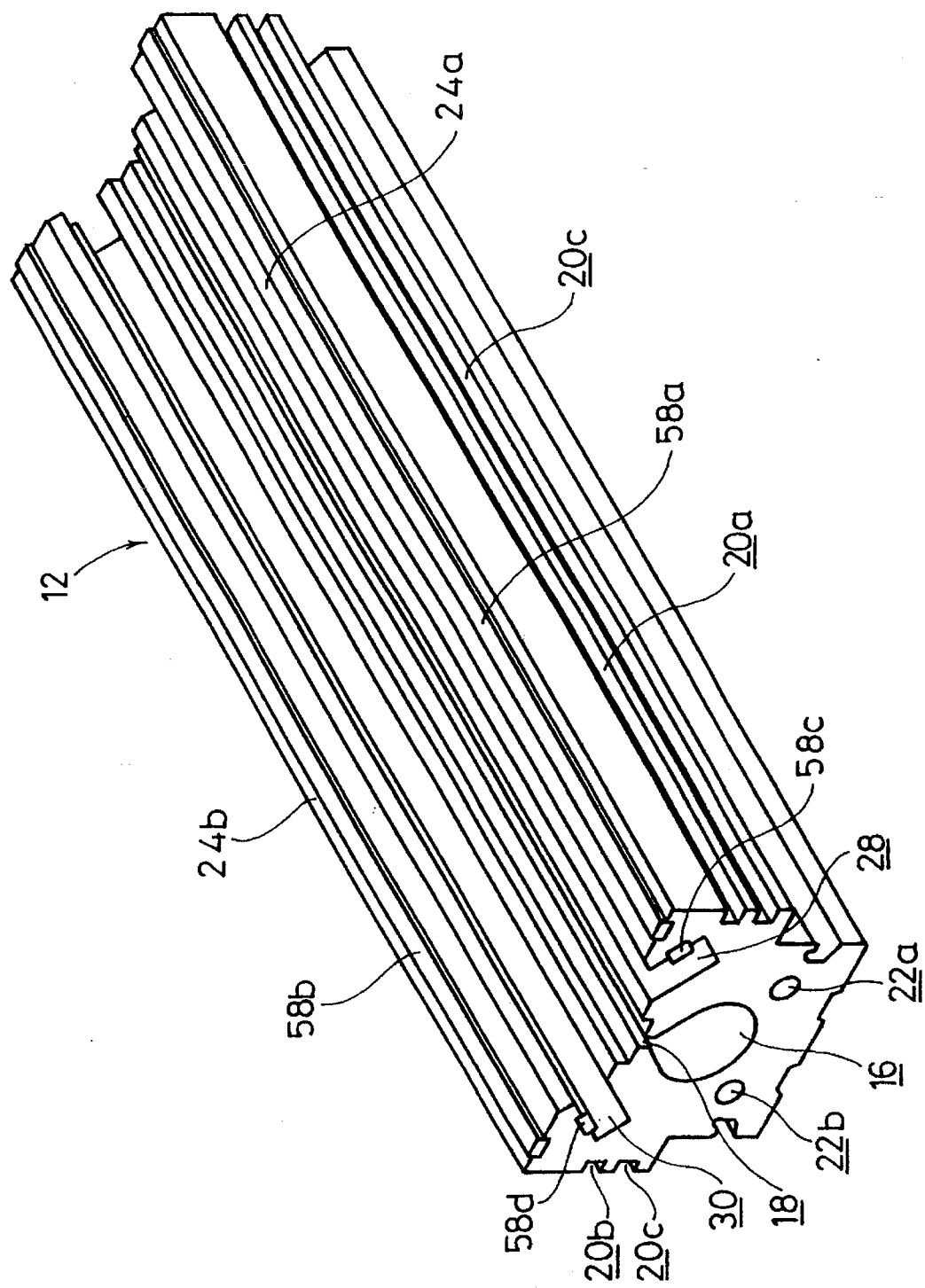
FIG. 2 is a perspective view of a cylinder tube of the rodless cylinder shown in FIG. 1.
Figure 3:
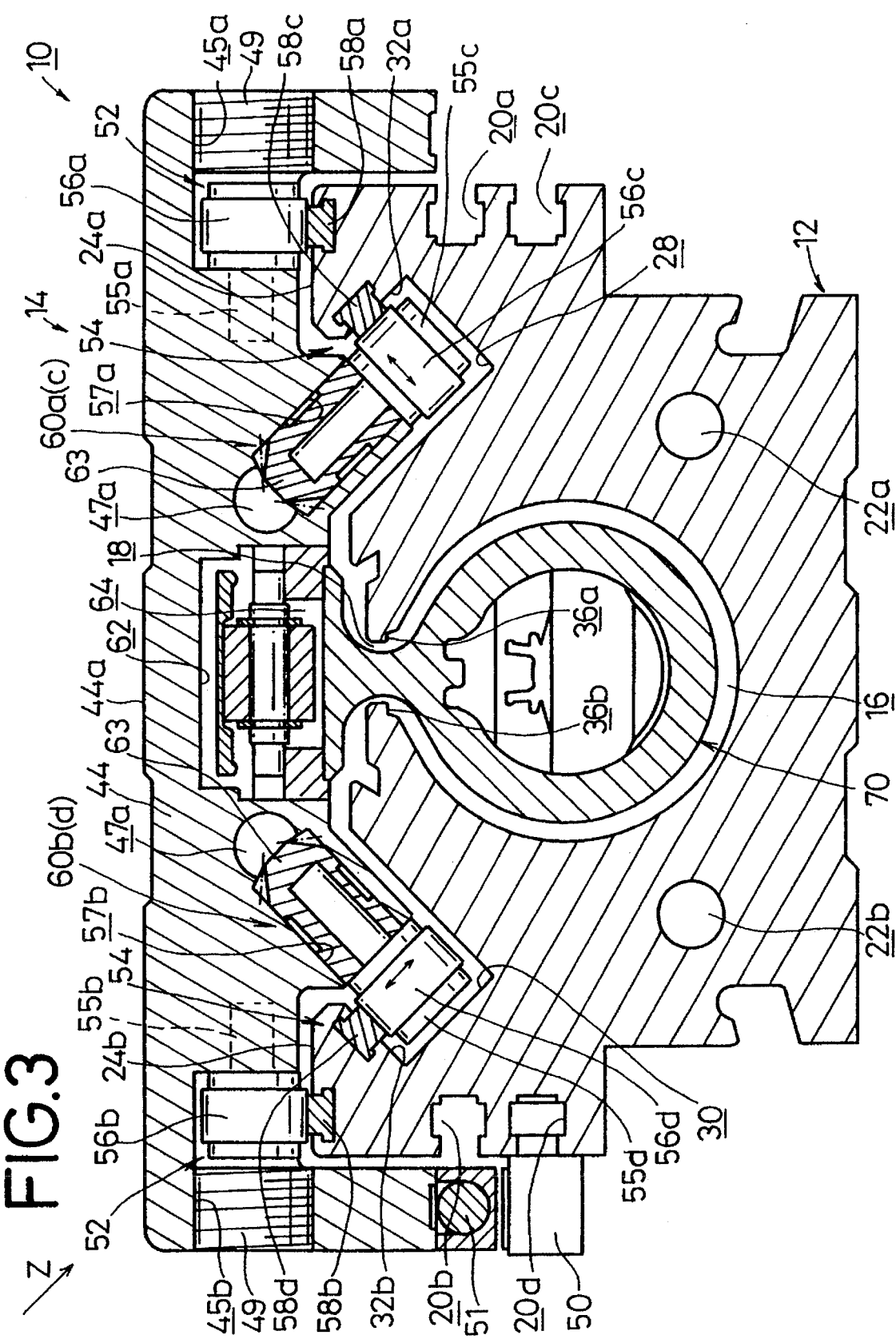
FIG. 3 is a vertical cress-sectional view of the cylinder tube and a slide table combined therewith.

As shown in FIG. 1, a rodless cylinder 10 according to the present invention includes a cylinder tube 12 and a slide table 14 longitudinally movably mounted on the cylinder tube 12. The cylinder tube 12 has a bore 16 (see FIG. 2) defined therein and extending longitudinally thereof. The bore 16 communicates with the exterior space through a slit 18 that is defined in an upper wall of the cylinder tube 12 and extending fully therealong. As shown in FIG. 3, the cylinder tube 12 has sensor attachment grooves 20a, 20b, 20c, 20d defined in outer opposite side wall surfaces thereof and extending in the longitudinal direction of the cylinder tube 12. The cylinder tube 12 also has two fluid bypass passages 22a, 22b defined therein and extending in the longitudinal direction of the cylinder tube 12, the fluid bypass passages 22a, 22b serving as part of a centralized piping system.

As shown in FIG. 3, the cylinder tube 12 has a pair of transversely spaced upper surfaces 24a, 24b disposed on opposite upper sides thereof and facing upwardly, the upper surfaces 24a, 24b having first and second recesses 28, 30 defined respectively in their inner ends. The first and second recesses 28, 30 are partly defined by respective side surfaces 32a, 32b positioned symmetrically on opposite sides of a vertical plane lying through the central axis of the cylinder tube 12. The side surfaces 32a, 32b are inclined upwardly at a certain angle in directions toward each other, i.e., toward the vertical plane.

The slit 18 which provides communication between the bore 16 and the exterior space is defined by opposite confronting side walls having respective steps 36a, 36b which spread away from each other in a direction toward the bore 16. The cylinder tube 12 has upper horizontal surfaces positioned one on each side of the slit 18 and extending outwardly away from the slit 18. The upper horizontal surfaces extending outwardly from the slit 18 then merge into respective downwardly inclined surfaces that are joined to the first and second recesses 28, 30, respectively.

The cylinder tube 12 has longitudinally opposite ends hermetically closed by respective end caps 40a, 40b (see FIG. 1) having respective ports 38a, 38b.

The slide table 14 will be described below with reference to FIGS. 3 and 4. The slide table 14 comprises a relatively thick horizontal plate 44 and a pair of vertical cover plates 46a, 46b (see FIG. 1) fixed to the respective opposite ends of the plate 44 in the longitudinal direction of the cylinder tube 12. Each of the cover plates 46a, 46b has two pairs of adjustment holes 47a, 47b (see FIG. 1) defined in a central region thereof and extending transversely therethrough, and each end wall of the slide table 14 also has two pairs of adjustment holes 47a, 47b (see FIG. 4) defined therein and extending certain distances in the slide table 14 (see FIG. 5) in the directions in which the slide table 14 is slidable along the cylinder tube 12. The plate 44 has opposite sides projecting outwardly from the opposite transverse sides of the cylinder tube 12 and each having a pair of holes 45a, 45b defined therein for insertion therein of guide rollers 56 (described later on) during a manufacturing process. The holes 45a, 45b are usually closed off by respective plugs 49. A magnetic sensor 50 for detecting the position of the slide table 14 along the cylinder tube 12 is mounted in the sensor attachment groove 20d, and a magnetic member 51 for actuating the magnetic sensor 50 is mounted on one of the opposite sides of the slide table 14 in confronting relation to the magnetic sensor 50.

As shown in FIG. 3, first holder mechanisms 52 and second holder mechanisms 54 are disposed on the lower surface of the slide table 14, the upper surfaces 24a, 24b of the cylinder tube 12, and in the first and second recesses 28, 30 for guiding the slide table 14 along the cylinder tube 12 and bearing a load acting on the slide table 14 when a piston (described later on) is moved back and forth in the cylinder tube 12. Actually, the first holder mechanisms 52 serve to bear a load that is imposed vertically on the slide table 14, and the second holder mechanisms 54 serve as bearing mechanisms for allowing the slide table 14 to be displaced smoothly with respect to the cylinder tube 12, and also serve to bear a load that is imposed horizontally on the slide table 14. There are four first holder mechanisms 52 and four second holder mechanisms 54 as can be understood from FIG. 4.

The first holder mechanisms 52 comprise respective rods 55a, 55b (two rods 55a and two rods 55b) extending horizontally and fixed to respective lower portions of the slide table 14, respective guide rollers 56a, 56b (two guide rollers 56a and two guide rollers 56b) rotatably mounted on outer distal ends of the rods 55a, 55b, respectively, and respective rails 58a, 58b fixedly mounted on the respective upper surfaces 24a, 24b of the cylinder tube 12 and supporting the respective guide rollers 56a, 56b on their upper horizontal surfaces in rolling contact therewith. The opposite sides of the slide table 14 project a certain distance downwardly beyond the upper horizontal surfaces of the rails 58a, 58b on which the guide rollers 56a, 56b ride, for thereby preventing dust particles from entering between the rails 58a, 58b and the guide rollers 56a, 56b.

The second holder mechanisms 54 comprise respective rods 55c, 55d (two rods 55c and two rods 55d) supported on the lower surface of the slide table 14 and inclined downwardly in opposite directions away from each other, respective guide rollers 56c, 56d (two guide rollers 56c and two guide rollers 56d) rotatably mounted on outer distal ends of the rods 55c, 55d, respectively, and respective rails 58c, 58d fixedly mounted on the respective side surfaces 32a, 32b of the cylinder tube 12 and supporting the respective guide rollers 56c, 56d on their downwardly oblique surfaces in rolling contact therewith.

The plate 44 has holes 57a, 57b (two holes 57a and two holes 57b) defined in the lower surface thereof and inclined downwardly in opposite directions away from each other, the holes 57a, 57b communicating with the adjustment holes 47a, 47b, respectively. The holes 57a, 57b accommodate therein four bearing adjustment mechanisms 60a~60d, respectively, for adjusting the rolling contact between the guide rollers 56c, 56d and the rails 58a, 58b. Since the bearing adjustment mechanisms 60a~60d are substantially identical in structure to each other, the bearing adjustment mechanism 60b will be described below with reference to FIG. 5.

Figure 5:
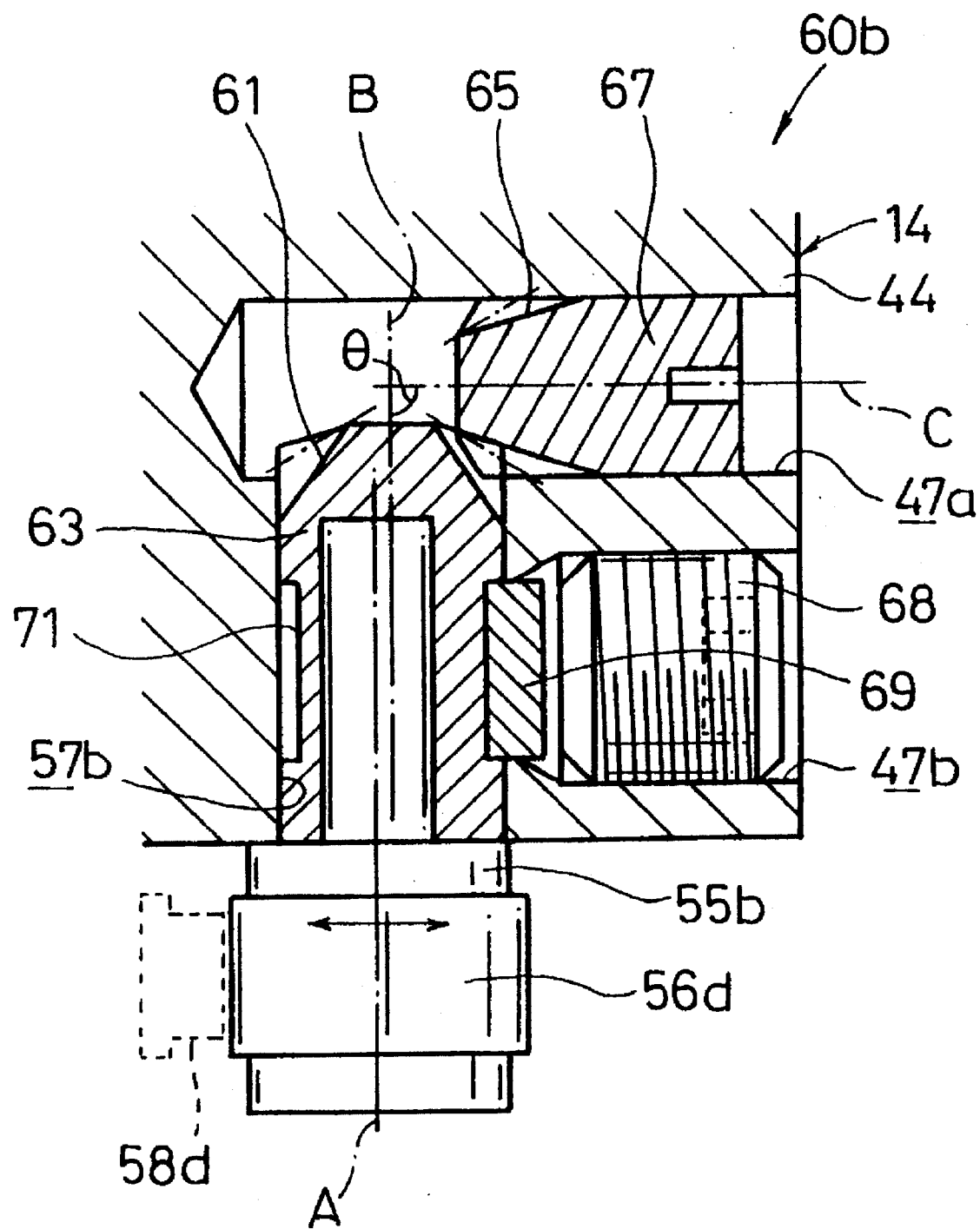
FIG. 5 is a partial cross-sectional view of a bearing adjusting mechanism as viewed in the direction indicated by the arrow Z in FIG. 3.

As shown in FIG. 5, the bearing adjustment mechanism 60b comprises a first bevel gear 63 rotatably mounted in the hole 57b and supporting the rod 55b, the first bevel gear 63 having inclined gear teeth 61 on its distal end, and a second bevel gear 67 rotatably mounted in the adjustment hole 47a communicating substantially perpendicularly to the hole 57b and having inclined gear teeth 65 on its distal end which are held in mesh with the teeth 61 of the first bevel gear 63. The rod 55b is eccentrically supported by the first bevel gear 63 such that the rod 55b has a central axis A positioned out of alignment with a central axis B of the first bevel gear 63. Therefore, when the first bevel gear 63 is turned about its central axis B, the central axis A of the rod 55b is turned about the central axis B, causing the guide roller 56d to be displaced in the directions indicated by the arrows perpendicular to the central axes A, B. Therefore, the rolling contact between the guide roller 56d and the rail 58d can be adjusted.

In the illustrated rodless cylinder 10, the central axis B of the first bevel gear 63 lies at an angle θ of about 90° with respect to a central axis C of the second bevel gear 67. However, the adjustment hole 47a may be defined in the slide table 14 at a different angle to vary the angle θ such that the adjustment holes 47a, 47b may be defined in the opposite transverse side walls of the slide table 14 for adjustment of the bearing mechanisms from the opposite transverse sides of the slide table 14.

Since the rolling contact between the guide rollers 55c, 55d and the rails 58c, 58d of the second holder mechanisms 54 can thus be adjusted, if the cylinder tube 12 is replaced with a cylinder tube of a different shape, then it is possible to position the guide rollers 56c, 56d in a manner to match the cylinder tube shape or adjust the guide rollers 56c, 56d to roll on the rails 58c, 58d at a suitable angle. The first and second bevel gears 63, 67 may be replaced with worm gears each composed of a worm and a worm wheel meshing therewith.

Figure 9:
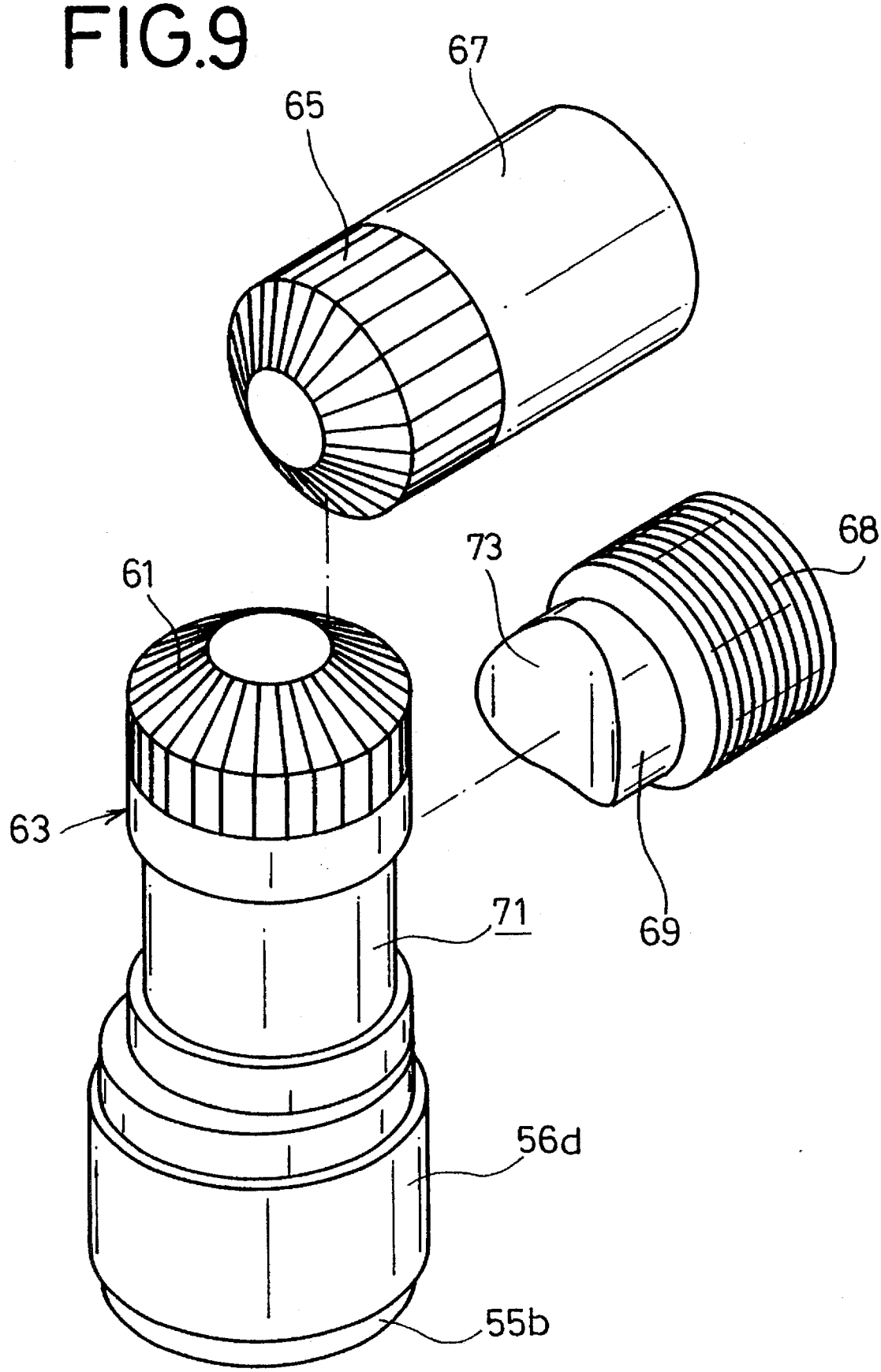
FIG. 9 is a perspective view of first and second bevel gears and a stopper.

As shown in FIG. 5, a screw 68 is threadedly mounted in the adjustment hole 47b, and a stopper 69 which is pressed when the screw 68 is threaded is disposed partly in a circumferential groove 71 defined in an outer circumferential surface of the first bevel gear 63. The stopper 69 is effective in preventing the first bevel gear 63 from being unduly turned in the hole 57b. The surface of the stopper 69 which is held in contact with the bottom of the circumferential groove 71 is shaped a curved surface 73 (see FIG. 9) complementary in shape to part of the bottom of the circumferential groove 71. The second bevel gear 67 and the screw 68 have respective outer ends exposed outwardly and having slots defined therein for receiving a screwdriver bit for turning the second bevel gear 67 and the screw 68.

Figure 4:
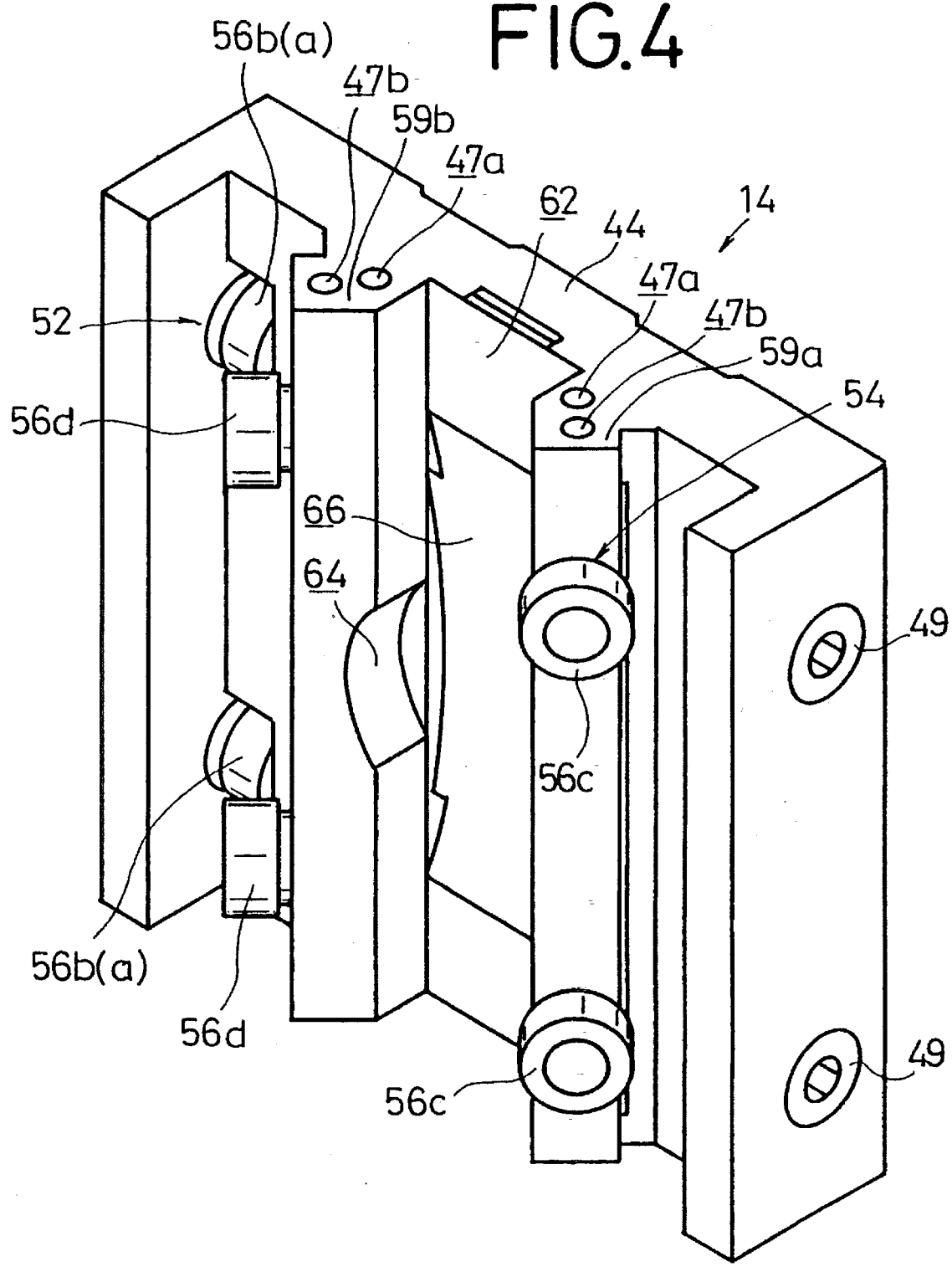
FIG. 4 is a perspective view of the slide table.

As shown in FIG. 4, the slide table 14 has a groove 62 defined centrally in the lower surface thereof and extending in the longitudinal direction thereof. The groove 62 has a circular central region providing a circular space 64, and also includes a recess 66 having a bottom surface curved toward an upper surface 44a of the plate 44 which is remote from the cylinder tube 12.

Figure 6:
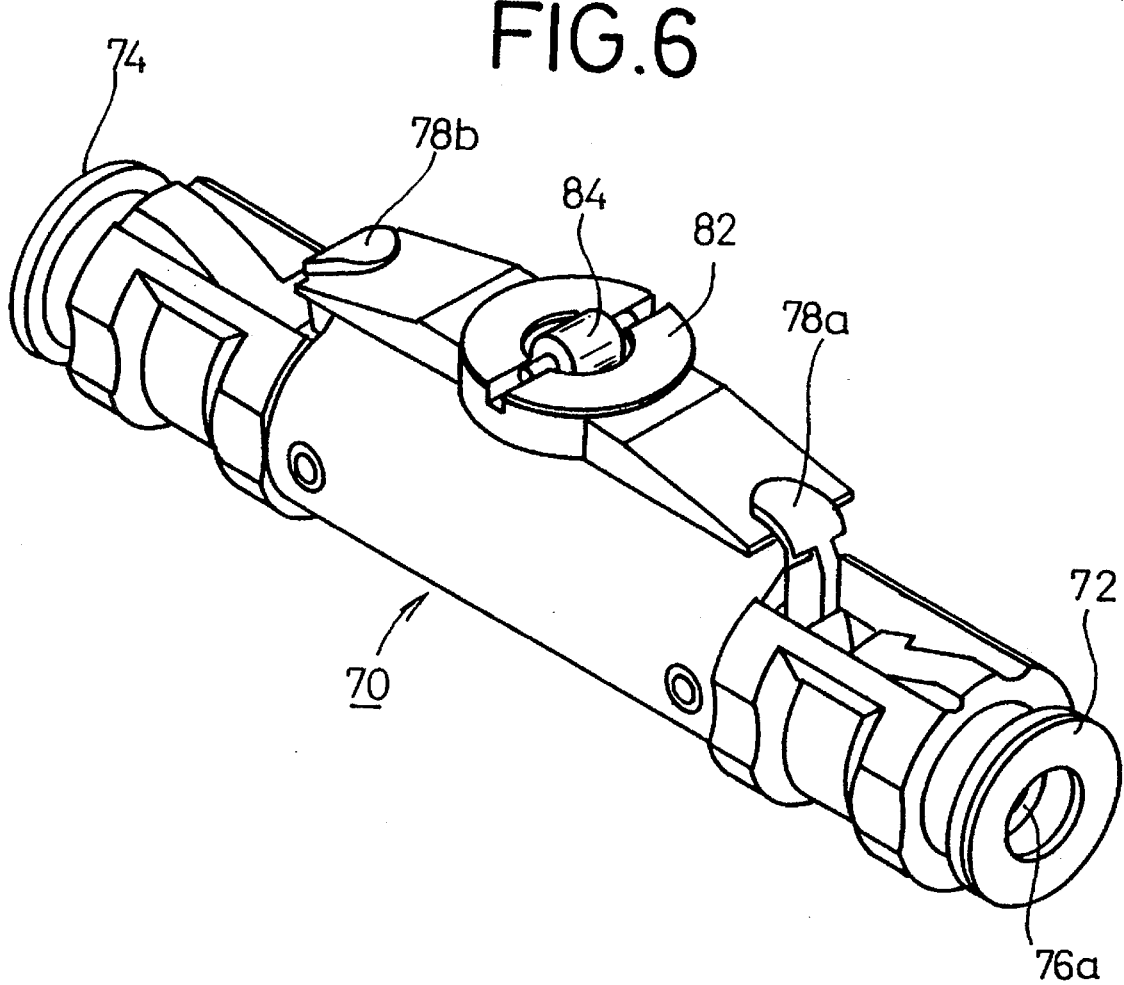
FIG. 6 is a perspective view of a piston of the rodless cylinder shown in FIG. 1.
Figure 7:
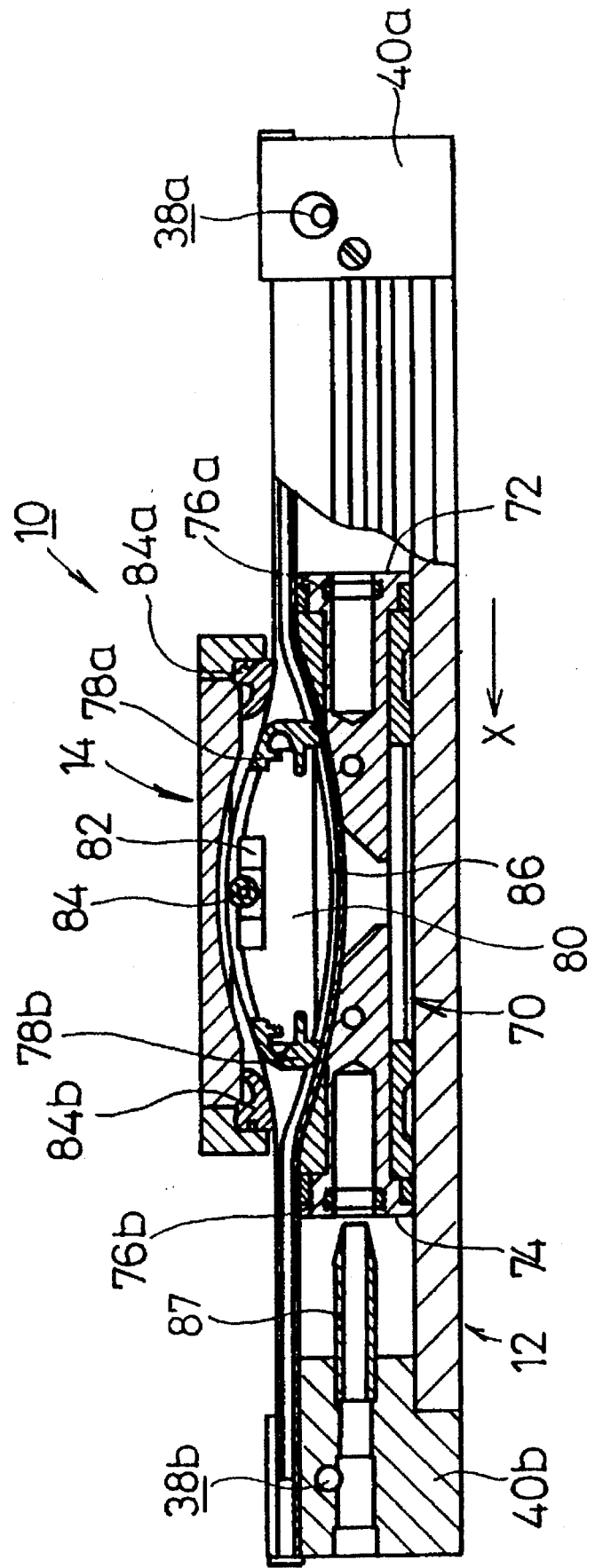
FIG. 7 is a vertical sectional side elevational view of the rodless cylinder shown in FIG. 1.

FIG. 6 shows a piston 70 which is to be movably mounted in the bore 16. The piston 70 is of a generally cylindrical elongate configuration and has a first pressure-bearing surface 72 on one end thereof and a second pressure-bearing surface 74 on an opposite end thereof, and a pair of cushion seals 76a, 76b (see also FIG. 7) disposed respectively in the first and second pressure-bearing surfaces 72, 74. Belt separators 78a, 78b are fixed to a piston yoke 80 on an upper central portion of the piston 70. A roller 84 is mounted on an upper portion of the piston yoke 80 by a coupler 82. As shown in FIG. 7, two spaced scrapers 84a, 84b are disposed in the slide table 14, and the coupler 82 is fitted in the circular space 64 of the groove 62 in the slide table 14. The piston 70 has a passage 86 defined therein for allowing a first seal (described later on) to enter therethrough into the piston 70. Cushion rings 87 (only one shown in FIG. 7) are attached to the respective end caps 40a, 40b in communication with the respective ports 38a, 38b.

Figure 8:
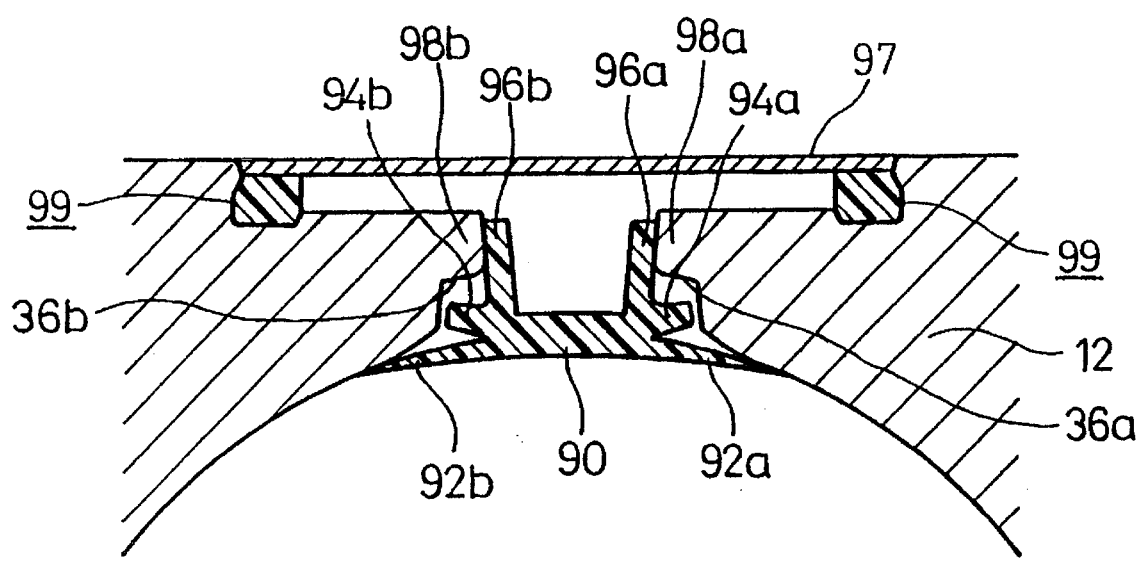
FIG. 8 is a fragmentary cross-sectional view of a first seal member engaging in a slit in the rodless cylinder shown in FIG. 1.

FIG. 8 shows a first seal 90 fitted in the steps 36a, 36b. The first seal 90 which is of an elongate structure has a pair of tongues 92a, 92b extending transversely away from each other and a pair of teeth 94a, 94b projecting transversely away from each other above the respective tongues 92a, 92b. The first seal 90 also includes a pair of engaging arms 96a, 96b extending upwardly from the respective teeth 94a, 94b and slightly spreading away from each other in the upward direction. The teeth 94a, 94b serve to engage the steps 36a, 36b, respectively, when an internal pressure is developed in the piston 70. The engaging arms 96a, 96b engage respective inner surfaces 98a, 98b of the cylinder tube 12 which jointly define the slit 18 therebetween. The first seal 90 is of an integral structure molded of flexible synthetic resin. A second seal 97 which is of a flat elongate shape engages in a groove 99 defined in the central upper surface of the cylinder tube 12 above the slit 18 and extending longitudinally of the cylinder tube 12, thereby covering the slit 18. The first seal 90 enters into the piston 70 through the passage 86 and has opposite ends fixed to the respective end caps 40a, 40b. The second seal 97 also has opposite ends fixed to the respective end caps 40a, 40b.

Operation of the rodless cylinder 10 of the above construction will be described below.

After the rodless cylinder 10 has been assembled as shown in FIG. 1, the contact between the slide table 14 and the cylinder tube 12 is adjusted by the bearing adjusting mechanism 60b as follows.

As shown in FIG. 5, a screwdriver bit is inserted into the adjustment hole 47a which is defined in one of the end wall surfaces of the slide table 14 which extend substantially perpendicularly to the upper surface thereof and is turned in engagement with the second bevel gear 67 to turn the second bevel gear 67 in one direction. When the second bevel gear 67 is thus turned, the first bevel gear 63 is turned, turning the rod 55b about its own central axis A. Since the central axis A of the rod 55b is held out of alignment with the central axis B of the first bevel gear 63, the guide roller 56d rotatably mounted on the distal end of the rod 55b is displaced in one of the directions indicated by the arrows. As a result, the pressure imposed on the rail 58d by the guide roller 56d is varied, thereby adjusting the rolling contact between the rail 58d and the guide roller 56d. The other bearing adjusting mechanisms 60a, 60c, 60d are also adjusted in the same manner as described above.

After the bearing adjusting mechanisms 60a, 60b, 60c, 60d have been adjusted, a screwdriver bit is inserted into the adjusting hole 47b and turned in engagement with the screw 68, thus causing the stopper 69 to lock the first bevel gear 63 against rotation. The guide roller 56d is therefore held in smooth rolling engagement with the rail 58d. The screws 68 associated with the other bearing adjusting mechanisms 60a, 60c, 60d are similarly turned to lock the first bevel gears 63 against rotation.

Thereafter, air is introduced under pressure from the port 38a into the cushion ring 87 communicating therewith, thereby pressing the first pressure-bearing surface 72. The piston 70 is now displaced to the left in the direction indicated by the arrow X in FIG. 7. At this time, since the coupler 82 engages in the space 64 in the slide table 14, the piston 70 displaces the slide table 14 in unison therewith also to the left in the direction indicated by the arrow X in FIG. 7. When the slide table 14 is displaced, the belt separators 78a, 78b separate the first and second seals 90, 97 from each other between the slide table 14 and the piston 70. Therefore, a workpiece placed on the slide table 14 can be fed to the left in the direction indicated by the arrow X in FIG. 7. While the piston 70 is being displaced in the direction indicated by the arrow X, the slide table 14 is supported by the first and second holder mechanisms 52, 54, and smoothly displaced in the longitudinal direction of the cylinder tube 12 by the guide rollers 56a, 56b, 56c, 56d held in rolling contact with the rails 58a, 58b, 58c, 58d. The piston 70 and hence the slide table 14 can be moved to the right when air is introduced under pressure into the port 38b. Upon displacement of the slide table 14, the roller 84 is held in rolling engagement with the second seal 97 to facilitate smooth movement of the slide table 14.

Figure 10:
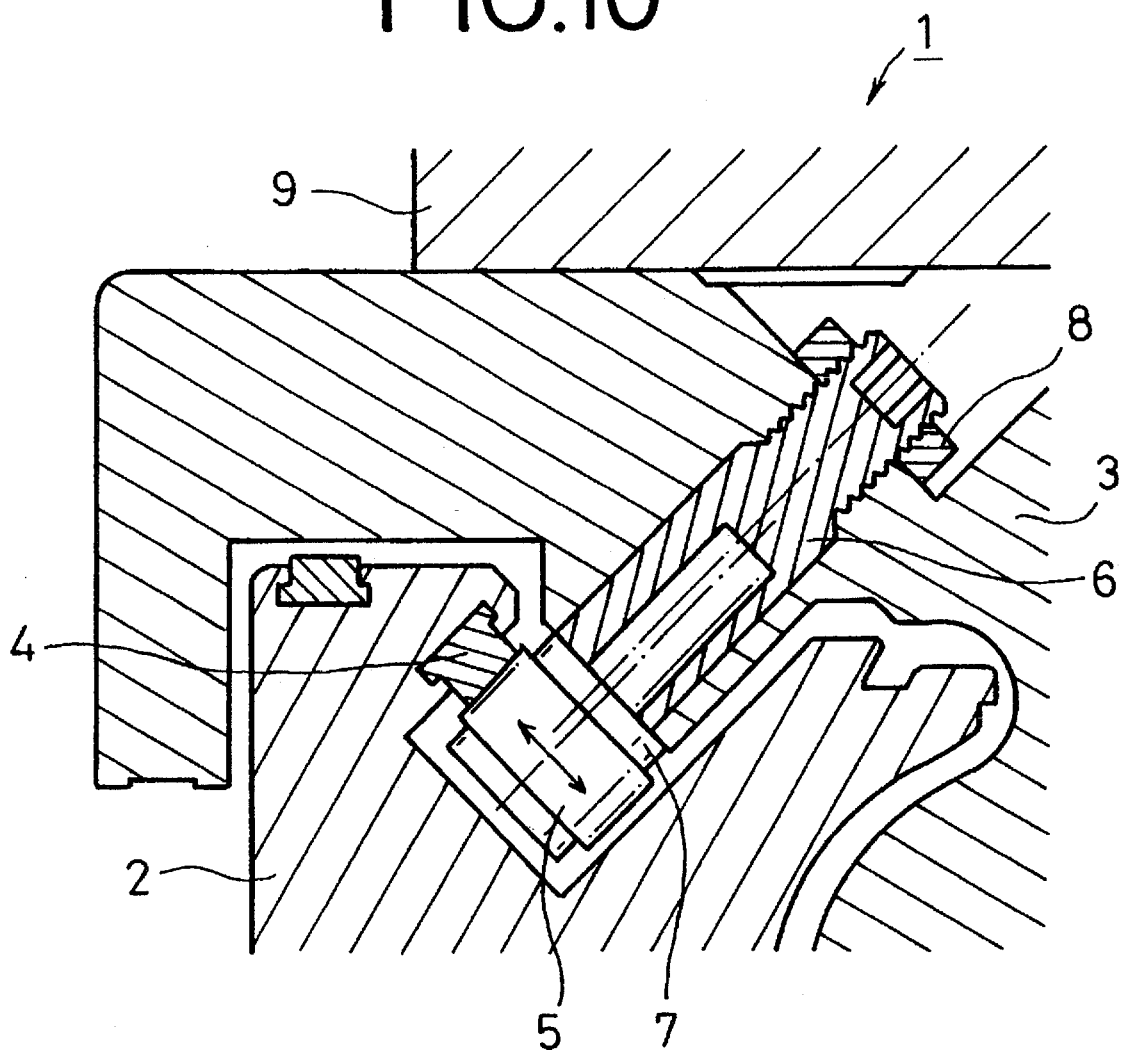
FIG. 10 is a fragmentary cross-sectional view of a conventional rodless cylinder.

In the conventional rodless cylinder 1 shown in FIG. 10, as described above, the adjustment hole is defined in the upper surface of the slide table 3, limiting the direction in which the screw 6 can be accessed for adjustment. After the workpiece 9 is fastened to the upper surface of the slide table 1, the screw 6 can no longer be accessed for adjustment. If the screw 6 needs to be readjusted after the workpiece 9 is fastened to the upper surface of the slide table 1 or after the rodless cylinder 1 is incorporated in another apparatus, then the workpiece 9 has to be detached from the slide table 1 or the rodless cylinder 1 has to be removed from the apparatus.

With the bearing adjusting mechanisms 60a~60d according to the present invention, however, one or more of the adjustment holes 47a, 47b may be defined in any surfaces of the slide table 14, e.g., side surfaces perpendicular to the upper surface thereof or other side surfaces thereof, by suitably selecting the angle between the first and second bevel gears 63, 67, so that no limitations will be placed on the direction in which the second bevel gears 67 are accessible. Consequently, even after a workpiece is fastened to the slide table 14 or the rodless cylinder 10 is incorporated in another apparatus, the bearing mechanisms can easily be adjusted without having to detach the workpiece from the slide table 14 or remove the rodless cylinder 10 from the apparatus.

When the rodless cylinder 10 which is incorporated in another apparatus is to be serviced for maintenance, the bearing adjusting mechanisms 60a~60d permit the second holder mechanisms 54 serving as bearing mechanisms to be adjusted from freely accessible directions. Consequently, the rodless cylinder 10 can be serviced in a short period of time without dismounting itself from the apparatus.

The first and second bevel gears 63, 67 may be machined by a header or molded of synthetic resin for reducing their cost.

Although a certain preferred embodiment of the present invention has been shown and described in detail, it should be understood that various changes and modifications may be made therein without departing from the scope of the appended claims.

What is claimed is:

1. A bearing adjusting mechanism in a rodless cylinder, comprising:

a cylinder tube having ports for introducing and discharging a fluid under pressure, said cylinder tube having a rail extending therealong;

a piston disposed in said cylinder tube for displacement along the cylinder tube by the fluid introduced under pressure into said cylinder tube;

a slide table coupled to said piston for supporting a workpiece thereon, said slide table having a guide roller held in rolling contact with said rail, wherein said bearing adjusting mechanism comprises:

means for adjusting the rolling contact of said guide roller with said rail, said guide roller being mounted on a first shaft and eccentrically offset from a central axis of said first shaft, said first shaft being disposed in said slide table; and means for allowing an eccentric axis of said guide roller to be turned from an outer wall of said slide table, said means for allowing comprising a second shaft at a predetermined angle, wherein a central axis of said second shaft differs from the axis of said first shaft.

2. A bearing adjusting mechanism according to claim 1, wherein said rail has an engaging surface facing obliquely downwardly, and said guide roller is rotatably supported on a rod mounted on a lower surface of said slide table and inclined to a vertical direction, said guide roller being held in rolling engagement with said engaging surface.

3. A bearing adjusting mechanism according to claim 1, wherein said second shaft comprises a gear shaft rotatably mounted in a hole defined in said outer wall of said slide table and having a first gear on an end thereof;

said first shaft comprises an adjustment shaft having a second gear on an end thereof which is held in mesh with said first gear at said predetermined angle; and further comprising, a rod coupled to an opposite end of said adjustment shaft out of alignment with said central axis of said adjustment shaft, said guide roller being rotatably supported on said rod.

4. A bearing adjusting mechanism according to claim 1, wherein said outer wall of the slide table extends perpendicularly to an upper surface of the slide table, said adjusting mechanism having an adjustment hole defined in said outer wall, said second shaft being accessible through said adjustment hole.

5. A bearing adjusting mechanism according to claim 3, wherein said first gear and said second gear comprise bevel gears, respectively.

6. A bearing adjusting mechanism according to claim 3, wherein said adjusting mechanism includes a stopper for engaging said first gear to lock the first gear against rotation.

7. A bearing adjusting mechanism according to claim 6, wherein said first gear has a circumferential groove defined therein, said stopper having an end surface curved complementarily in shape to part of a bottom of said circumferential groove.

* * * * *